(12) United States Patent
Kim et al.

(10) Patent No.: US 7,929,478 B2
(45) Date of Patent: Apr. 19, 2011

(54) OPTIMAL RESOURCE ALLOCATION IN A MULTI-HOP OFDMA WIRELESS NETWORK WITH COOPERATIVE RELAYING

(75) Inventors: Seung-Jun Kim, Plainsboro, NJ (US); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 798 days.

(21) Appl. No.: 11/953,105

(22) Filed: Dec. 10, 2007

(65) Prior Publication Data

US 2008/0225774 A1 Sep. 18, 2008

Related U.S. Application Data

(60) Provisional application No. 60/894,550, filed on Mar. 13, 2007.

(51) Int. Cl.
 *H04B 7/14* (2006.01)
(52) U.S. Cl. .................................................. 370/315
(58) Field of Classification Search ............... 370/315
 See application file for complete search history.

(56) References Cited

U.S. PATENT DOCUMENTS

| | | | |
|---|---|---|---|
| 2005/0003824 A1* | 1/2005 | Siris | 455/452.1 |
| 2007/0211757 A1* | 9/2007 | Oyman | 370/468 |
| 2008/0316958 A1* | 12/2008 | Casone et al. | 370/329 |

OTHER PUBLICATIONS

"Cross-layer Optimization for Fairness in OFDMA Cellular Networks with Fixed Relays", Authors: Lei You, Mei Song, Junde Song, Published: Dec. 13, 2005 http://202.194.20.8/proc/GLOBECOM2008/DATA/12-13-05.PDF.*
R. Bruno, M. Conti, and E. Gregori, "Mesh networks: commodity multihop ad hoc networks," IEEE Commun. Mag., vol. 43, No. 3, pp. 123-131, Mar. 2005.
R. L. Cruz and A. V. Santhanam, "Optimal routing, link scheduling and power control in multi-hop wireless networks," in Proc. IEEE INFOCOM, vol. 1, Mar.-Apr. 2003, pp. 702-711.
M. Chiang, "To layer or not to layer: balancing transport and physical layers in wireless multihop networks," in Proc. IEEE INFOCOM, vol. 4, Mar. 2004, pp. 2525-2536.
L. Chen, S. H. Low, and J. C. Doyle, "Joint congestion control and media access control design for ad hoc wireless networks," in Proc. IEEE INFOCOM, vol. 3, Mar. 2005, pp. 2212-2222.
M. Cao, X. Wang, S.-J. Kim, and M. Madihian, "Multi-hop wireless backhaul networks-a cross-layer design paradigm," IEEE J. Sel. Areas Commun., 2007, accepted for publication.
J. Huang, V. Subramanian, R. Agrawal, and R. Berry, "Downlink scheduling and resource allocation for OFDM systems," in Proc. Conf. Info. Sci. Syst. (CISS), 2006.

(Continued)

*Primary Examiner* — Jeffrey Pwu
*Assistant Examiner* — Noel Beharry
(74) *Attorney, Agent, or Firm* — Bao Tran; Joseph Kolodka (57) ABSTRACT

An optimal resource allocation strategy for OFDMA multi-hop wireless networks is disclosed. The system allocates one or more resources in a multi-hop network by solving one or more higher-layer sub-problem; solving one or more physical layer and media access control (PHY/MAC) layer sub-problems per tone per time slot with one of cooperative relaying of radio signals or spatial reusing of radio spectrum; updating prices; and allocating radio resources based on the PHY/MAC layer sub-problems.

16 Claims, 4 Drawing Sheets

OTHER PUBLICATIONS

Koutsopoulos and L. Tassiulas, "Cross-layer adaptive techniques for throughput enhancement in wireless OFDM-based networks," IEEE/ACM Trans. Network., vol. 14, No. 5, pp. 1056-1066, Oct. 2006.

R. Cendrillon, W. Yu, M. Moonen, J. Verlinden, and T. Bostoen, "Optimal multiuser spectrum balancing for digital subscriber lines," IEEE Trans. Commun., vol. 54, No. 5, pp. 922-933, May 2006.

W. Yu and R. Lui, "Dual methods for nonconvex spectrum optimization of multicarrier systems," IEEE Trans. Commun., vol. 54, No. 7, pp. 1310-1322, Jul. 2006.

K. Seong, M. Mohseni, and J. M. Cioffi, "Optimal resource allocation for OFDMA downlink systems," in Proc. ISIT, Seattle, WA, Jul. 2006, pp. 1394-1398.

L. Xiao, M. Johansson, and S. P. Boyd, "Simultaneous routing and r~source allocation via dual decomposition," IEEE Trans. Commun., vol. 52, No. 7, pp. 1136-1144, Jul. 2004.

R. Madan and S. Lall, "Distributed algorithms for maximum lifetime routing in wireless sensor networks," in Proc. IEEE GLOBECOM, 2004, pp. 748-753.

J. N. Laneman, D. N. C. Tse, and G. W. Wornell, "Cooperative diversity in wireless networks: efficient protocols and outage behavior," IEEE Trans. Info. Theory, vol. 50, No. 12, pp. 3062-3080, Dec. 2004.

A. Bletsas, A. Khisti, D. P. Reed, and A. Lippman, "A simple cooperative diversity method based on network path selection," IEEE J. Sel. Areas Commun.

Maric and R. D. Yates, "Cooperative multihop broadcast for wireless networks," IEEE J. Sel. Areas Commun., vol. 22, No. 6, pp. 1080-1088, Aug. 2004.

A. Nosratinia, T. E. Hunter, and A. Hedayat, "Cooperative communication in wireless networks," IEEE Commun. Mag., vol. 42, No. 10, pp. 74-80, Oct. 2004.

J. Boyer, D. Falconer, and H. Yanikomeroglu, "Multihop diversity in wireless relaying channels," IEEE Trans. Commun., vol. 52, No. 10, pp. 1820-1830, Oct. 2004.

B. Zhao and M. C. Valenti, "Practical relay networks: a generalization of hybrid-ARQ," IEEE J. Sel. Areas Commun., vol. 23, No. 1, pp. 7-18, Jan. 2005.

M. Dohler, A. Gkelias, and H. Aghvami, "A resource allocation strategy for distributed MIMO multi-hop communication systems," IEEE Commun. Lett., vol. 8, No. 2, pp. 99-101, Feb. 2004.

A. Wittneben, 1. Hammerstrom, and M. Kuhn, "Joint cooperative diversity and scheduling in low mobility wireless networks," in Proc. IEEE GLOBECOM, 2004, pp. 780-784.

T. Ng, W. Yu, J. Zhang, and A. Reid, "Joint optimization of relay strategies and resource allocations in cooperative cellular networks," in Proc. Conf. Info. Sci. Syst. (CISS), 2006.

R. Madan, S. Cui, S. Lall, and A. Goldsmith, "Cross-layer design for lifetime maximization in interference-limited wireless sensor networks," in Proc. IEEE INFOCOM, 2005, pp. 1964-1975.

G. Narlikar, G. Wilfong, and L. Zhang, "Designing multihop wireless backhaul networks with delay guarantees," in Proc. IEEE INFOCOM, 2006.

M. Chiang, C. W. Tan, D. P. Palomar, D. O'Neill, and D. Julian, "Power control by geometric programming," IEEE Trans. Wireless Commun., 2007.

T. Nandagopal, T. Kim, X Gao, and V. Bharghavan, "Achieving MAC layer fairness in wireless packet networks," in Proc. ACM/IEEE Int'l Conf. Mobile Comput. Net. (MOBICOM), Boston, MA, 2000, pp. 87-98.

R. Karrer, A. Sabharwal, and E. Knightly, "Enabling large-scale wireless broadband: the case for TAPs," ACMSIGCOMM Comput. Commun. Rev., vol. 34, No. 1, pp. 27-32, Jan. 2004.

J. Yuan, Z. Li, W. Yu, and B. Li, "A cross-layer optimization framework for multihop multicast in wireless mesh networks," IEEE J. Sel. Areas Commun., vol. 24, No. 11, pp. 2092-2103, Nov. 2006.

A. Lozano, A. M. Tulin, and S. Verdli, "Mercury/waterfilling: optimum power allocation with arbitrary input constellations," in Proc. ISIT, Sep. 2005, pp. 1773-1777.

J. Boyer, D. Falconer, and H. Yanikomeroglu, "On the impact of system resource constraints on wireless relaying channels," in Proc. IEEE ICC, May 2005, pp. 3266-3270.

H. Ochiai, P. Mitran, H. V. Poor, and V. Tarokh, "Collaborative beamforming for distributed wireless ad hoc sensor networks," IEEE Trans. Sig. Proc., vol. 53, No. 11, pp. 4110-4124, Nov. 2005.

J. Papandriopoulos, S. Dey, and J. Evans, "Distributed cross-layer optimization of MANETs in composite fading," in Proc. ICC, Istanbul, TUrkey, Jun. 2006.

P. Hande, S. Zhang, and M. Chiang, "Distributed rate allocation for inelastic flows," IEEE/ACM Trans. Network., Nov. 2005.

D. P. Bertsekas, "Approximation procedures based on the method of multipliers," J. Optim. Theory Appl., vol. 23, No. 4, pp. 487-510, Dec. 1977.

D. P. Bertsekas, G. S. Lauer, N. R. Sandell, Jr., and T. A. Posbergh, "Optimal shortterm scheduling of large-scale power systems," IEEE Trans. Auto. Control, vol. AC-28, No. 1, pp. 1-11, Jan. 1983.

Koutsopoulus, I. et al., "Adaptive Resource Allocationin SDMA-based Wirless Broadband Networks with OFDMA Signaling", INFOCOM 2002, Proceedings of the 21st Annual Joint Conference of the IEEE Computer and Communications Societies.

Comstock, D. et al., "A Flexible Multi-Hop Frame Structure of IEEE 802.16J", IEEE C802.16j-06_163rl, Nov. 2006.

* cited by examiner

OPTIMAL RESOURCE ALLOCATION IN A MULTI-HOP OFDMA WIRELESS NETWORK WITH COOPERATIVE RELAYING

The present application claims priority to Provisional Application Ser. No. 60/894,550 filed Mar. 13, 2007, the content of which is incorporated by reference.

BACKGROUND

The present invention relates to optimal resource allocation in a multi-hop OFDMA wireless network with cooperative relaying.

Unlike the wired networks, wireless networks face additional challenges due to the shared nature of the wireless channel. That is, the capacities of different links in the wireless networks may be coupled as the links experience interference from each other. Thus, an optimal resource allocation strategy is required for efficient use of the network resources Permitting simple receiver design in the frequency-selective channels, OFDMA is a major access technology for the future broadband networks. However, from the viewpoint of radio resource allocation, OFDMA yields a much more complex problem due to the existence of a large number of parallel subchannels. The difficulty is aggravated in the interference environment where multiple links can potentially share the subchannels. In OFDMA systems, the channels are subdivided in the frequency domain into subchannels, to which the given power resources must be allocated. If more than one links are to be activated in the same subchannel simultaneously, mutual interference between the links must also be considered. Also, if the cooperative relaying technique is to be employed for enhanced spectral efficiency, the power split between the cooperating relays must be determined while still accounting for the aforementioned interference issue.

In one approach, a closed-form solution was obtained for the power and spectrum allocation problem for multi-hop MIMO cooperative relay networks by approximating $\log(1+x)$ by $\sqrt{x}$. It was then verified that the approximate solution is actually quite close to the exact optimal solution within a wide range of operating SNR. However, the power constraint was imposed on the network-wide total power instead of the individual power constraints per node. Also, the work assumed a flat fading channel, and hence may not be suitable for frequency selective channels that appear in wideband signaling. In another approach, the optimal power and rate control problem was solved for an OFDMA cooperative cellular network, where the mobiles can act as cooperative relays for other mobile terminals. Depending on the channel conditions perceived by the mobiles on each tone, the mobiles may opt to employ the cooperative relaying on that tone. However, since the decision is made on a tone-by-tone basis, the mobiles must be able to transmit on a particular tone at the same time as they listen on another tone.

SUMMARY

An optimal resource allocation strategy for OFDMA multi-hop wireless networks is disclosed. The system allocates one or more resources in a multi-hop network by solving one or more higher-layer sub-problem; solving one or more physical layer and media access control (PHY/MAC) layer sub-problems per tone per time slot with one of cooperative relaying of radio signals or spatial reusing of radio spectrum; updating prices; and allocating radio resources based on the PHY/MAC layer sub-problems.

Implementations of the above aspect can include one or more of the following. The process first solves high layer sub problems such as $$\max_{s, s_{min}, x} s_{min} - \lambda^T x$$

subject to $s_{min} s$ $$Ax = s$$

$$x \geq 0.$$

The system can also solve PHY/MAC sub-problems per tone per time slot without cooperative relaying and no spatial reuse such as:

$$P_\ell^{(n,t)*} = \left[ \frac{\lambda_\ell}{\mu_{S(\ell)}^{(t)} + \epsilon} - \frac{1}{G_{\ell\ell}^{(n)}} \right]^+$$

$$\ell^* = \arg\max_\ell \{\lambda_\ell \log(1 + G_{\ell\ell}^{(n)} P_\ell^{(n,t)*}) - \mu_{S(\ell)}^{(t)} P_\ell^{(n,t)*} \big|_{\ell \in \mathcal{A}_t(\mathcal{G})} \}$$

The system also solves the PHY/MAC sub-problems per tone per time slot, but with cooperative relaying and no spatial reuse $$P_\ell^{(n,t)*} = \left[ \frac{\lambda_\ell}{\mu_{S(\ell)}^{(t)} + \epsilon} - \frac{1}{G_{k^*, S(\ell)}^{(n)}} \right]^+$$

$$\hat{P}_\ell^{(n,t)*}(k_i) = \frac{1}{\eta_i^2} \left[ \frac{\lambda_\ell \eta_i}{\mu_{k_i}^{(t)} + \epsilon} - \frac{1}{G_{Q(\ell), k_i}^{(n)}} \right]^+$$

$$\ell^* = \arg\max_\ell \Big\{ \lambda_\ell \log(1 + G_{\ell\ell}^{(n)} P_\ell^{(n,t)*}) - \mu_{S(\ell)}^{(t)} P_\ell^{(n,t)*} \big|_{\ell \in \mathcal{A}_t(\mathcal{G})},$$

$$\lambda_\ell \log(1 + G_{k^*, S(\ell)}^{(n)} P_\ell^{(n,t)*}) - \mu_{S(\ell)}^{(t)} P_\ell^{(n,t)*} \big|_{\ell \in \mathcal{A}_t(\mathcal{G}') \cap \mathcal{E}_b},$$

$$\lambda_\ell \log\left(1 + \left(\sum_{k \in R(\ell)} \sqrt{G_{Q(\ell), k}^{(n)} \hat{P}_\ell^{(n,t)*}(k)}\right)^2\right) - \sum_{k \in R(\ell)} \mu_k^{(t)} \hat{P}_\ell^{(n,t)*}(k) \Big|_{\ell \in \mathcal{A}_t(\mathcal{G}') \cap \mathcal{E}_c} \Big\}.$$

Additionally, the system solves the PHY/MAC sub-problems per tone per time slot, but with no cooperative relaying and with spatial reuse Solve $\max \sum_{\ell \in \mathcal{A}_t} \lambda_\ell c_\ell^{(n,t)} - \sum_k (\mu_\ell^{(t)} + \epsilon) \sum_{\substack{\ell \in O(k) \\ \ell \in \mathcal{A}_t}} P_\ell^{(n,t)}$ subject to $P_\ell^{(n,t)} \geq 0$, $c_\ell^{(n,t)} \leq \log\left(1 + \dfrac{G_{\ell\ell}^{(n)} P_\ell^{(n,t)}}{\sum_{\substack{\ell' \neq \ell \\ \ell' \in \mathcal{A}_t}} G_{\ell\ell'}^{(n)} P_{\ell'}^{(n,t)} + 1}\right)$ Additionally, the process solves the PHY/MAC sub-problems per tone per time slot, but with cooperative relaying and spatial reuse $$\max \sum_{\ell \in \mathcal{A}_t(\mathcal{G}')} \lambda_\ell c_\ell^{(n,t)} - \sum_k (\mu_\ell^{(t)} + \epsilon) \left( \begin{array}{c} \sum_{\ell \in \mathcal{O}(k)} P_\ell^{(n,t)} + \\ \ell \in (\mathcal{E} \cup \mathcal{E}_b) \cap \mathcal{A}_t(\mathcal{G}') \\ \sum_{\ell \in \mathcal{E}_c \cap \mathcal{A}_t(\mathcal{G}')} \hat{P}_\ell^{(n,t)}(k) \\ k \in \mathcal{R}(\ell) \end{array} \right) \text{ s.t.}$$

$$c_\ell^{(n,t)} \leq \min_{k \in \mathcal{R}(\ell)} c_{\ell,k}^{(n,t)}, \forall \ell \in \mathcal{A}_t(\mathcal{G}') \cap \mathcal{E}_b,$$

$$c_{\ell,k}^{(n,t)} \stackrel{\Delta}{=} \log \left( 1 + \frac{G_{k,S(\ell)}^{(n)} P_\ell^{(n,t)}}{\sum_{\substack{\ell' \neq \ell \\ \ell' \in (\mathcal{E} \cup \mathcal{E}_b) \cap \mathcal{A}_t(\mathcal{G}')}} G_{k,S(\ell')}^{(n)} P_{\ell'}^{(n,t)} + \sum_{\substack{\ell' \neq \ell \\ \ell' \in \mathcal{E}_c \cap \mathcal{A}_t(\mathcal{G}')}} \sum_{k' \in \mathcal{R}(\ell')} G_{k,k'}^{(n)} \hat{P}_{\ell'}^{(n,t)}(k') + 1} \right)$$

$$c_\ell^{(n,t)} \leq \log \left( 1 + \frac{\left( \sum_{k \in \mathcal{R}(\ell)} \sqrt{G_{Q(\ell),k}^{(n)} \hat{P}_\ell^{(n,t)}(k)} \right)^2}{\sum_{\substack{\ell' \neq \ell \\ \ell' \in (\mathcal{E} \cup \mathcal{E}_b) \cap \mathcal{A}_t(\mathcal{G}')}} G_{Q(\ell),S(\ell')}^{(n)} P_{\ell'}^{(n,t)} + \sum_{\substack{\ell' \neq \ell \\ \ell' \in \mathcal{E}_c \cap \mathcal{A}_t(\mathcal{G}')}} \sum_{k' \in \mathcal{R}(\ell')} G_{Q(\ell),k'}^{(n)} \hat{P}_{\ell'}^{(n,t)}(k') + 1} \right),$$

$$\forall \ell \in \mathcal{A}_t(\mathcal{G}') \cap \mathcal{E}_c$$

$$c_\ell^{(n,t)} \leq \log \left( 1 + \frac{G_{\ell\ell}^{(n)} P_\ell^{(n,t)}}{\sum_{\substack{\ell' \neq \ell \\ \ell' \in (\mathcal{E} \cup \mathcal{E}_b) \cap \mathcal{A}_t(\mathcal{G}')}} G_{\ell\ell'}^{(n)} P_{\ell'}^{(n,t)} + \sum_{\substack{\ell' \neq \ell \\ \ell' \in \mathcal{E}_c \cap \mathcal{A}_t(\mathcal{G}')}} \sum_{k' \in \mathcal{R}(\ell')} G_{Q(\ell),k'}^{(n)} \hat{P}_{\ell'}^{(n,t)}(k') + 1} \right),$$

$$\forall \ell \in \mathcal{A}_t(\mathcal{G})$$

Prices are updated, and the process checks for convergence until convergence is achieved. The overall cross-layer optimization problem can be first decomposed into different layers using the dual decomposition technique. The system solves the PHY/MAC subproblem as a non-convex optimization problem. Modeling with and without cooperative relaying as well as per-tone decomposition can be performed. Given the formulations, the methods to solve the per-tone PHY/MAC subproblems including various practical issues regarding the optimization algorithms. In particular, closed-form expressions can be obtained for the optimal solutions in some special cases.

Advantages of the preferred embodiments may include one or more of the following. The preferred embodiment provides a centralized resource allocation method that can yield optimal or close-to-optimal end-to-end throughput in such a setting. Optimal power allocation in the network with pure OFDMA (that is, without spatial reuse of OFDM tones) itself is an advanced technique that can readily boost the throughput significantly. The system provides a closed-form solution for the PHY/MAC subproblem in this case, which makes the overall algorithm faster. The system allows spatial reuse and cooperative relaying enhancements. The cross-layer optimization problem is formulated that maximizes the balanced end-to-end throughput under the routing and the PHY/MAC constraints. A dual method is employed to solve the problem efficiently and optimally by decoupling it into different layers as well as into different OFDM tones. A cooperative relaying technique is incorporated into the framework to improve the performance. Mutual interference between the links is explicitly modeled to allow maximal spatial reuse of the spectral resources, and half-duplex operation of the radios is assumed. The numerical results exhibit how the bottleneck phenomenon typical in multi-hop networks can be alleviated by the proposed techniques to yield significant improvement in the throughput. The preferred embodiment provides an efficient method to solve the resource allocation problem for multi-hop wireless networks that use OFDMA technology. The preferred embodiment solves the optimal resource allocation problem in multi-hop wireless networks with an OFDMA air interface that can exploit spatial reuse and cooperative relaying. The system incorporates the cooperative relaying technique into the cross-layer design. In multi-hop networks, natural avenues can be used for exploiting cooperative communication techniques due to the relaying operation involved in routing the packets in the networks. The multi-hop routing constraints are explicitly modeled. The mutual co-channel interference is properly accounted for even with cooperative relaying while strict half-duplex constraints are enforced. The system provides a simple scheduling framework that preserves strict half-duplex operation. The system allows for a spatial reuse of the spectrum. That is, when a particular set of links impose relatively low interference to each other on a particular band, it is possible to activate those links simultaneously to maximize the spectral efficiency of the network. This situation occurs more frequently in the multi-hop networks as the network size grows, and is efficiently exploited.

DESCRIPTION

Figure 1:
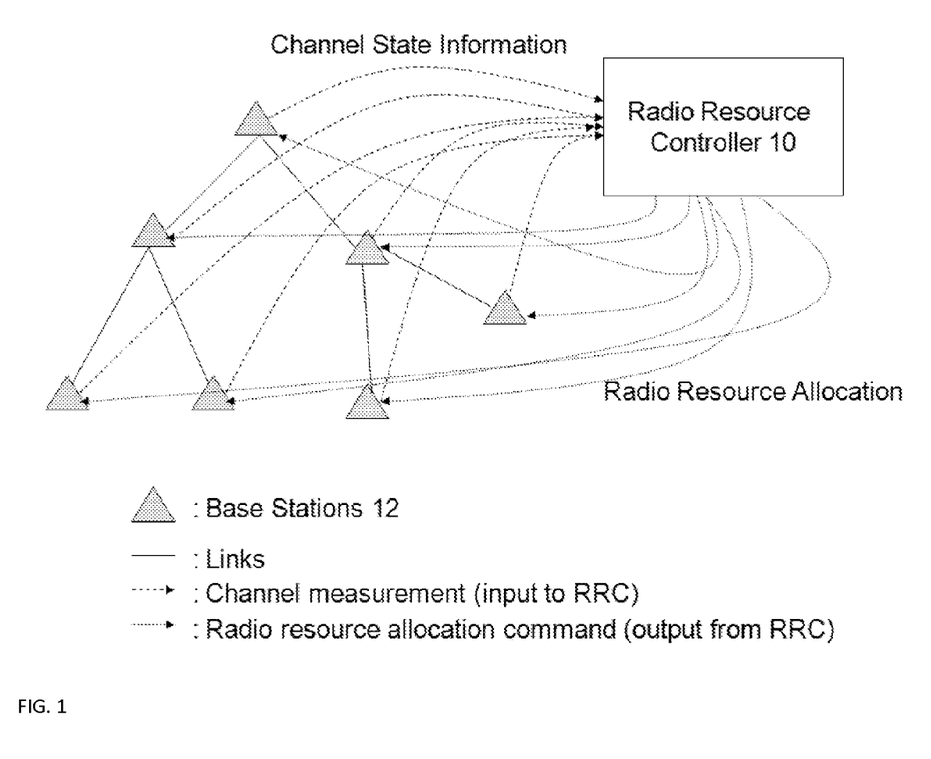
FIGS. 1-2 show diagrams illustrating a wireless communication network suitable for implementing one embodiment of the present invention.
Figure 2:
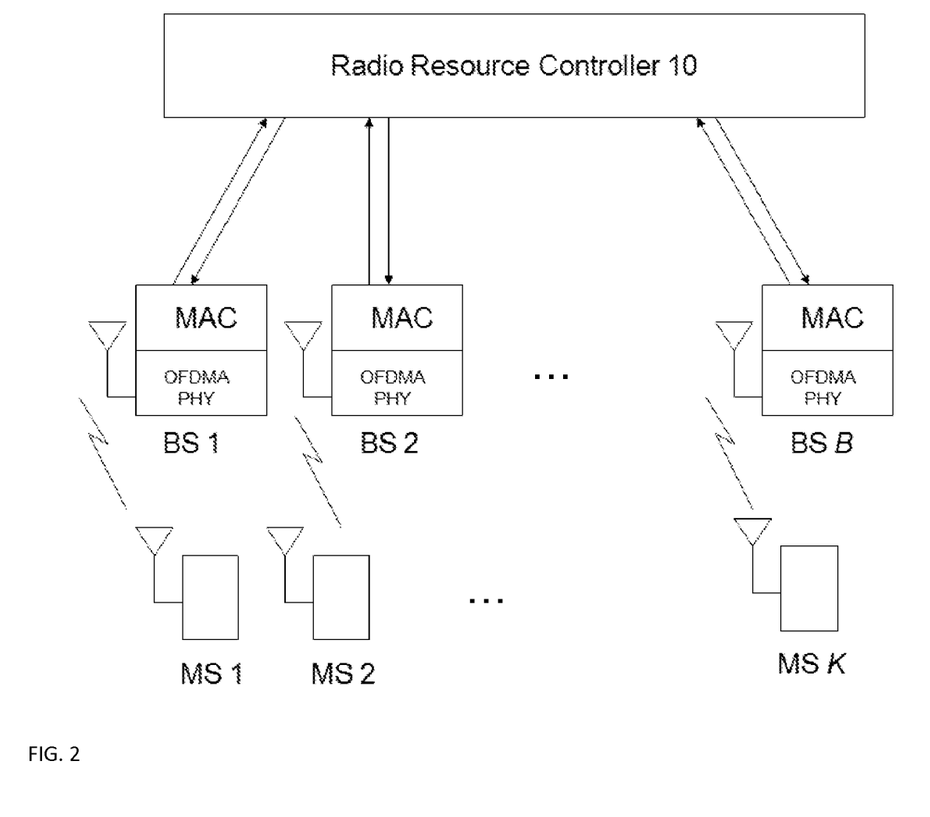

FIGS. 1-2 show diagrams illustrating a wireless OFDMA communication network suitable for implementing one embodiment of the present invention. In OFDMA systems, the channels are subdivided in the frequency domain into subchannels, to which the given power resources must be allocated. If more than one links are to be activated in the same subchannel simultaneously, mutual interference between the links must also be considered. Also, if the cooperative relaying technique is to be employed for enhanced spectral efficiency, the power split between the cooperating relays must be determined while still accounting for the aforementioned interference issue. Then, the goal of the resource allocation is to enhance the end-to-end throughput which measures the traffic rate from each of the nodes in the network that can be delivered to the gateway. To achieve this, how to route the traffic from the nodes in a multi-hop fashion must be jointly considered.

Turning now to FIG. 1, the wireless communication network includes a radio resource controller 10 receiving channel measurement data from a plurality of base stations BS. The base stations communicate with each other through one or more wireless links. The base stations also receive radio resource allocation commands from the radio resource controller 10.

Referring now to FIG. 2, the wireless network has, illustratively, a plurality of base stations BS1 . . . BSB, each having one or more wireless antennas. Each base station BS includes a media access control (MAC) layer and a physical layer (PHY) layer. The base station BS in turn communicates with one or more mobile stations MS1 . . . MSK, each of which can communicate with different base stations at different times.

Base stations BS illustratively have an array of multiple cooperating antennas so as to take advantage of multiple input, multiple output (MIMO) techniques, as discussed above. Each BS node is, for example and without limitation, a node in a wireless multi-hop network. In order to communicate with one another, the base stations BS of FIG. 1 may use the multiple antennas in those nodes to perform adaptive beamforming. As will be familiar to one skilled in the art, adaptive beamforming is a technique in which an array of antennas is able to achieve maximum reception in a specific angular direction by estimating the signal arrival from a desired direction (in the presence of noise) while signals of the same frequency from other directions are rejected. This is achieved by varying the weights of each of the transmitters (antennas) used in the array. The spatial separation of arriving signals is exploited to separate the desired signal from the interfering signals. In adaptive beamforming the optimum weights of the antennas are typically iteratively computed. As is also known to one skilled in the art, beamforming is generally accomplished by phasing the feed to each element of an array so that signals received or transmitted from all elements will be in phase in a particular direction.

Figure 3:
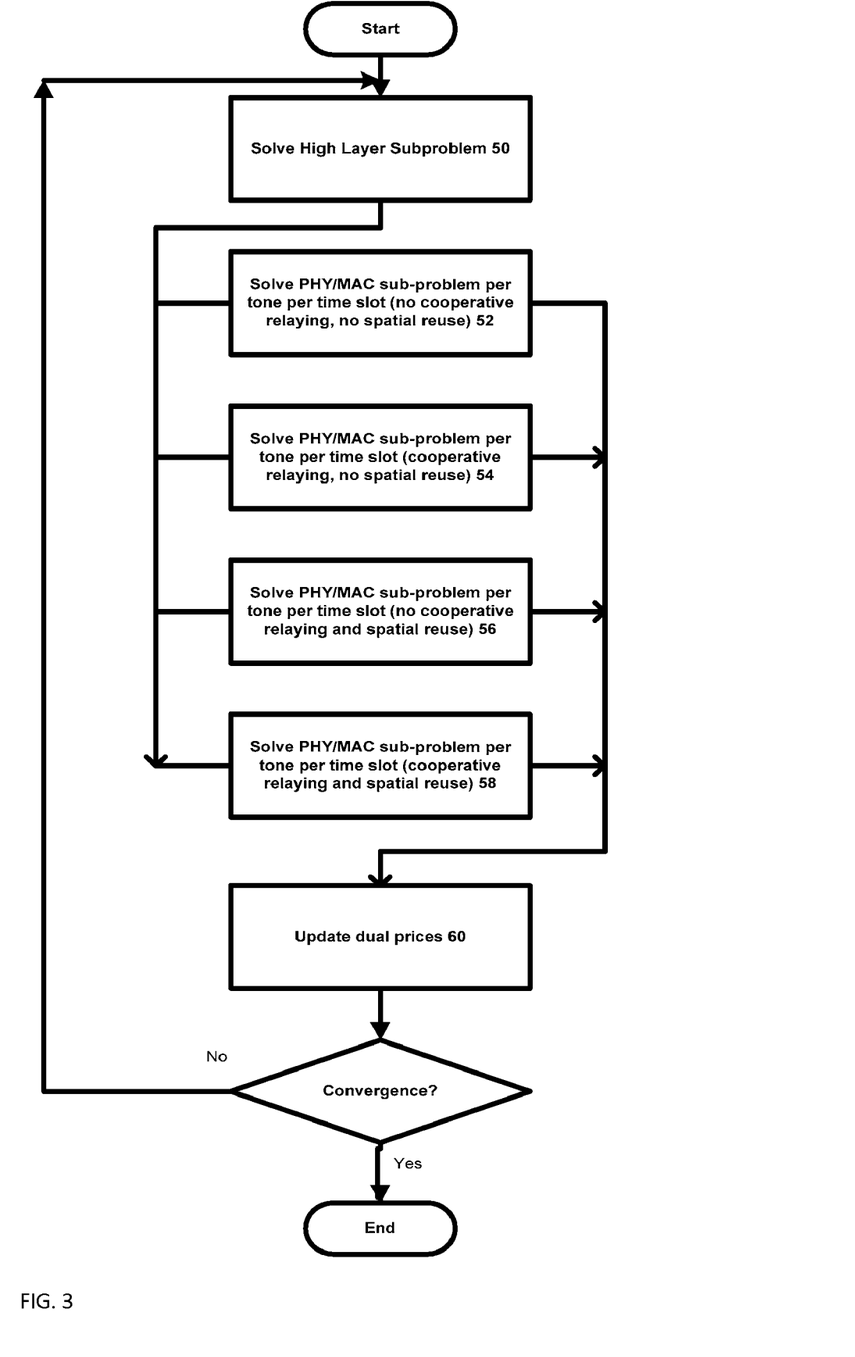
FIG. 3 shows one exemplary process for performing optimal resource allocation in a multi-hop OFDMA wireless network with cooperative relaying.

FIG. 3 shows one exemplary process for performing optimal resource allocation in a multi-hop OFDMA wireless network with cooperative relaying. In this process, the following annotations are used:

x: traffic flow vector
s: vector of end-to-end throughput
$P_l^{(n,t)}$: transmit power for link l on tone n in time slot t
$\hat{P}_l^{(n,t)}(k)$: transmit power at cooperative relay k associated with (virtual) link l on tone n in time slot t
$c_l^{(n,t)}$: link capacity of link l on tone n in time slot t
$P_{k,max}$ maximum transmit power at node k
$\lambda$: Lagrange multiplier (or relative weight) for link l
$\mu$: Lagrange multiplier associated with power constraints The process first solves high layer sub problems (50).

$$\max_{x,s,s_{min}} s_{min} - \lambda^T x$$

subject to $s_{min}s$ $Ax=s$ $x \succeq 0$

Next, the process solves PHY/MAC sub-problems per tone per time slot (52) if cooperative relaying with no spatial reuse is employed:

$$P_l^{(n,t)*} = \left[ \frac{\lambda_l}{\mu_{S(l)}^{(t)} + \epsilon} - \frac{1}{G_{ll}^{(n)}} \right]^+$$

$$l^* = \arg\max_l \{\lambda_l \log(1 + G_{ll}^{(n)} P_l^{(n,t)*}) - \mu_{S(l)}^{(t)} P_l^{(n,t)*} \mid l \in \mathcal{A}_t(\mathcal{G})\}$$

Alternatively, the process solves the PHY/MAC sub-problems per tone per time slot, but with cooperative relaying and no spatial reuse (54):

$$P_l^{(n,t)*} = \left[ \frac{\lambda_l}{\mu_{S(l)}^{(t)} + \epsilon} - \frac{1}{G_{k^*,S(l)}^{(n)}} \right]^+$$

$$\hat{P}_l^{(n,t)*}(k_i) = \frac{1}{\eta_i^2} \left[ \frac{\lambda_l \eta_i}{\mu_{k_i}^{(t)} + \epsilon} - \frac{1}{G_{Q(l),k_i}^{(n)}} \right]^+$$

$$l^* = \arg\max_l \Big\{ \lambda_l \log(1 + G_{ll}^{(n)} P_l^{(n,t)*}) - \mu_{S(l)}^{(t)} P_l^{(n,t)*} \mid_{l \in \mathcal{A}_t(\mathcal{G})},$$

$$\lambda_l \log(1 + G_{k^*,S(l)}^{(n)} P_l^{(n,t)*}) - \mu_{S(l)}^{(t)} P_l^{(n,t)*} \mid_{l \in \mathcal{A}_t(\mathcal{G}') \cap \varepsilon_b},$$

$$\lambda_l \log\left(1 + \left(\sum_{k \in \mathcal{R}(l)} \sqrt{G_{Q(l),k}^{(n)} \hat{P}_l^{(n,t)*}(k)}\right)^2\right) - \sum_{k \in \mathcal{R}(l)} \mu_k^{(t)} \hat{P}_l^{(n,t)*}(k) \Big|_{l \in \mathcal{A}_t(\mathcal{G}') \cap \varepsilon_c} \Big\}.$$

Alternatively, the process solves the PHY/MAC sub-problems per tone per time slot, but with no cooperative relaying and with spatial reuse (56):

$$\text{Solve } \max \sum_{l \in \mathcal{A}_t} \lambda_l c_l^{(n,t)} - \sum_k (\mu_k^{(t)} + \epsilon) \sum_{\substack{l \in O(k) \\ l \in \mathcal{A}_t}} P_l^{(n,t)}$$

$$\text{subject to } P_l^{(n,t)} \geq 0, \; c_l^{(n,t)} \leq \log\left(1 + \frac{G_{ll}^{(n)} P_l^{(n,t)}}{\sum_{\substack{l' \neq l \\ l' \in \mathcal{A}_t}} G_{ll'}^{(n)} P_{l'}^{(n,t)} + 1}\right)$$

Alternatively, the process solves the PHY/MAC sub-problems per tone per time slot, but with cooperative relaying and spatial reuse (58):

$$\max \sum_{l \in \mathcal{A}_t(\mathcal{G}')} \lambda_l c_l^{(n,t)} -$$

$$\sum_k (\mu_k^{(t)} + \epsilon) \left( \sum_{\substack{l \in O(k) \\ l \in (\varepsilon \cup \varepsilon_b) \cap \mathcal{A}_t(\mathcal{G}')}} P_l^{(n,t)} + \sum_{\substack{l \in \varepsilon_c \cap \mathcal{A}_t(\mathcal{G}') \\ k \in \mathcal{R}(l)}} \hat{P}_l^{(n,t)}(k) \right) \text{s.t.}$$

$$c_l^{(n,t)} \leq \min_{k \in \mathcal{R}(l)} c_{l,k}^{(n,t)}, \; \forall \; l \in \mathcal{A}_t(\mathcal{G}') \cap \varepsilon_b,$$

$$c_{l,k}^{(n,t)} \triangleq \log\left(1 + \frac{G_{k,S(l)}^{(n)} P_l^{(n,t)}}{\sum_{\substack{l' \neq l \\ l' \in (\varepsilon \cup \varepsilon_b) \cap \mathcal{A}_t(\mathcal{G}')}} G_{k,S(l')}^{(n)} P_{l'}^{(n,t)} + \sum_{\substack{l' \neq l \\ l' \in \varepsilon_c \cap \mathcal{A}_t(\mathcal{G}')}} \sum_{k' \in \mathcal{R}(l')} G_{k,k'}^{(n)} \hat{P}_{l'}^{(n,t)}(k') + 1}\right)$$

-continued $$c_l^{(n,t)} \le \log\left(1 + \frac{\left(\sum_{k \in R(l)} \sqrt{G_{Q(l),k}^{(n)} \hat{P}_l^{(n,t)}(k)}\right)^2}{\sum_{\substack{l' \ne l \\ l' \in (\varepsilon \cup \varepsilon_b) \cap \mathcal{A}_t(\mathcal{G}')}} G_{Q(l),S(l')}^{(n)} P_{l'}^{(n,t)} + \sum_{\substack{l' \ne l \\ l' \in \varepsilon_c \cap \mathcal{A}_t(\mathcal{G}')}} \sum_{k' \in R(l')} G_{Q(l),k'}^{(n)} \hat{P}_{l'}^{(n,t)}(k') + 1}\right),$$

$$\forall l \in \mathcal{A}_t(\mathcal{G}') \cap \varepsilon_c$$

$$c_l^{(n,t)} \le \log\left(1 + \frac{G_{ll}^{(n)} P_l^{(n,t)}}{\sum_{\substack{l' \ne l \\ l' \in (\varepsilon \cup \varepsilon_b) \cap \mathcal{A}_t(\mathcal{G}')}} G_{ll'}^{(n)} P_{l'}^{(n,t)} + \sum_{\substack{l' \ne l \\ l' \in \varepsilon_c \cap \mathcal{A}_t(\mathcal{G}')}} \sum_{k' \in R(l')} G_{Q(l),k'}^{(n)} \hat{P}_{l'}^{(n,t)}(k') + 1}\right), \forall l \in \mathcal{A}_t(\mathcal{G})$$

Prices are updated (60), and the process checks for convergence (62) and until convergence is achieved it loops back to 50. The system of FIGS. 3A-3B takes into account the cross-layer interaction in an optimal fashion and solves the PHY/MAC problem with spatial reuse and/or cooperative relaying.

In the multi-hop network consisting of K base stations (BSs) and a gateway node with the radio resource controller 10, where the gateway node is connected to the core network via a high-capacity wireline link. The BSs function as the access points that aggregate the user data to be transported to the gateway node. The BSs form a mesh topology to achieve multi-hop connectivity to the gateway by means of a network entry and topology formation protocol. It is assumed that this topology has already been formed and fixed. The network topology can be modeled as a directed graph $\mathcal{G}=(\mathcal{V},\mathcal{E})$, where $\mathcal{V}$ is the set of K+1 nodes representing the BSs and the gateway node, and $\mathcal{E}$ is the set of L directed edges representing the links between the BSs. For each edge $l \in \mathcal{E}$, the head (transmitter) is denoted by S(l), and the tail (receiver) is denoted by Q(l). Also, denote the set of edges that start from a node $k \in \mathcal{V}$ by $\mathcal{O}(k)$, and the set of edges entering a node k by $\mathcal{I}(k)$. To simplify the exposition, it is assumed that the traffic is only in the upstream direction from the BSs to the gateway and no traffic is injected from the gateway toward the BSs.

The radios installed in the nodes are assumed to operate in a half-duplex mode. That is, a radio cannot transmit and receive at the same time. For practical concerns, the duplexing mode is assumed to be the same for all the OFDM sub-channels within a radio. Thus, when a radio is in the transmission [reception] mode, it cannot receive [transmit] in any of its subchannels.

Due to the half-duplex assumption, an appropriate link scheduling scheme must be introduced to formulate the problem. Here, the "even-odd" scheduling framework is used to address a QoS-guaranteed multi-hop network optimization problem.

Consider a frame consisting of T time slots. To simplify the exposition, it is assumed that there are only two time slots within a frame (T=2) and each slot is indexed by the slot number t=0 or 1. The idea of the "even-odd" framework is to partition the nodes in the network into two groups such that by scheduling those groups in different time slots, the half-duplex constraint is satisfied. In a tree-topology network, this can be easily accomplished by grouping the nodes based on their hop distances from the gateway: if the hop distance of a node is an even [odd] number, the node belongs to the "even" ["odd"] group. Then, all the nodes in the "even" group are activated (i.e., transmit) in time slot 0, when all the nodes in the "odd" group listen. In the next time slot t=1, the nodes in the "odd" group are activated.

This framework can be extended to the mesh topology if a certain constraint is imposed on the topology. The difference of the mesh topology from the tree topology is that there can be more than one route between each node and the gateway. In order to make the grouping rule based on the hop count unambiguous, the hop counts along any of those multiple routes must have the same remainder when divided by 2. The network topology formation protocol ensures that this is the case. Therefore, even in a mesh-topology network, the half-duplex constraint can be met by activating the "even" group of nodes in time slot t=0 and the "odd" group of nodes in time slot t=1.

Note that activating a node k implies that all the links emanating from that node $\mathcal{O}(k)$ are activated. Denote the set of links activated in time slot t by $\mathcal{A}_t$. The links activated in the same time slot may be multiplexed over different OFDM tones to avoid interference totally, which corresponds to the pure OFDMA without spatial reuse. In a cross-layer setting, the optimization space is quite large even for this simple strategy, as for each tone and time slot, a link must be chosen with appropriate transmit power and rate to satisfy the routing and the power constraints and optimize a higher-layer performance objective. A centralized network controller that first collects the frequency-selective channel gains and runs the optimization algorithm to obtain the optimal solutions.

When spatial resource reuse is to be exploited by activating more than one links in an OFDM tone, one has to deal with the co-channel interference, which often makes the relevant physical layer optimization problem non-convex. Also, when cooperative relaying strategy is to be employed, one has to find out which links must cooperative over which tones in each time slot. Apparently, it is a challenging optimization problem, where it is important to keep the complexity of the optimization algorithm contained.

The cross-layer optimization problems are often formulated as network utility maximization (NUM) problems, where the aim is to maximize a concave utility function of the end-to-end flows under the specific constraints arising from the limited network resources. Here, the cross-layer optimization problem is formulated to maximize the minimum throughput among all BSs under the routing and the PHY constraints. This ensures a fair throughput is achieved from each BS to the gateway, regardless of the actual hop distances to the gateway. The fairness is an important performance goal in multi-hop wireless networks. The system then solves an optimization problem given by subject to $$\max s_{min} \quad (1)$$

$$s_{min} \le s \quad (2)$$

$$x \in \mathcal{F}(s) \quad (3)$$

$$x \le c \quad (4)$$

$$c \in \mathcal{C} \quad (5)$$

where the k-th element $s_k$ of s represents the throughput of the flow from BS k to the gateway, $s_{min}$ the minimum of $s_k$, k=1, 2, ..., K as is enforced by the constraint, the l-th element $x_l$ of x is the data flow rate over link l, and the l-th element $c_l$ of c is the PHY capacity of link l. The network flow region $\mathcal{F}$ is characterized by the network topology and the routing constraints. Eq. 3 requires that the flow rate vector x should obey these constraints. The PHY capacity region $\mathcal{C}$ is governed by the PHY/MAC resource constraints as well as the specific PHY/MAC schemes employed to establish the wireless connections. Eq. 5 enforces that the link capacities lie within the supportable PHY/MAC rate region.

It can be seen that the only coupling constraint between the PHY/MAC layer and the higher layers is (4), which states that the link flow rate cannot exceed the capacity provided by the PHY/MAC layer. A layered approach is possible by solving the problem in the dual domain introducing a Lagrange multiplier vector λ to relax this constraint. The partial Lagrangian can be written as $$\mathcal{L}_{layer}(s, s_{min}, x, c, \lambda) = s_{min} - \lambda^T(x-c). \quad (1)$$

The dual objective function is then given by $$g(\lambda) = \max_{s, s_{min}, x, c} \mathcal{L}_{layer}(s, s_{min}, x, c, \lambda) \text{ subject to (2), (3), and (5)} \quad (7)$$

$$= \max_{s, s_{min}, x} \{s_{min} - \lambda^T x \mid s_{min} \leq s, x \in \mathcal{F}(s)\} + \quad (8)$$

$$\max_c \{\lambda^T c \mid c \in \mathcal{C}\}$$

In (8), it is evident that the problem is now decoupled into the higher layer (the first term) and the PHY/MAC layer (the second term). The optimal Lagrange multiplier is obtained by solving the dual problem $$\min_{\lambda \geq 0} g(\lambda). \quad (9)$$

Provided that the duality gap is zero, the primal optimal variables $s_{min}^*$, $s^*$, $x^*$ and $c^*$ can be recovered from the dual optimal variable $\lambda^*$. The optimal Lagrange multiplier $\lambda^*$ can be obtained by updating λ using the subgradient method or the ellipsoid method. For example, in the subgradient method, the update in the m-th step is given by $$\lambda(m+1) = [\lambda(m) + \alpha_m(x^* - c^*)]^+, \quad (10)$$

where $\alpha_m$ is the step size, and $[\cdot]^+$ represents the projection onto the nonnegative orthant. In order to obtain the optimal flow vector $x^*$ and the optimal capacity vector $c^*$, the associated subproblems must be solved.

The higher-layer subproblem is precisely the first maximum in (8). It is now necessary to characterize the feasible flow rate region $\mathcal{F}(s)$. Note that the network topology is fully characterized by a matrix $A \in \{-1, 0, 1\}^{K \times L}$, whose (k, l)-element $a_{kl}$ is given by $$a_{kl} = \begin{cases} 1 & \text{if } l \in O(k) \\ -1 & \text{if } l \in \mathcal{J}(k) \\ 0 & \text{otherwise.} \end{cases} \quad (11)$$

Assume that a plain routing without network coding is employed to route the packets. Then, given the throughput vector s, $\mathcal{F}(s)$ is characterized by the conditions $$Ax = s \quad (12)$$

$$x \geq 0, \quad (13)$$

where (12) represents the flow conservation constraints and (13) represents the requirement that the flow rates must be nonnegative. The resulting higher-layer subproblem $$\max_{s, s_{min}, x} s_{min} - \lambda^T x \quad (14)$$

subject to $s_{min} s$ $Ax = s$ $x \geq 0$.

is a linear program that can be efficiently solved.

The PHY/MAC subproblem is given by the second maximum in (8), which is a weighted capacity maximization problem with the dual prices $\lambda_l$ playing the role of the weighting factor for link l. The capacity region $\mathcal{C}$ depends on the specific transmission strategy employed in the physical layer as well as the power resource constraints imposed on the radios. In the next subsection, the capacity region without the cooperative relaying technique is first described, which is followed by the subsection that extends the formulation to the case with cooperative relaying.

For simplicity of the practical receiver design, it is assumed that joint decoding of superposition-coded multi-user signals is not considered. Thus, the discussion is confined to the case of single-user decoding where the signals not contributed by the desired user are simply treated as interference. However, the present framework can easily incorporate the joint decoding case.

In the cross-layer interaction of the OFDMA multi-hop network and the associated optimization algorithms, the link capacity is modeled by a Shannon-type formula that does not accurately model the specific coding and modulation schemes employed in the actual systems. Again, with recent advances in formulating and solving the OFDMA resource allocation problems with practical coding and modulation schemes, it is quite feasible to incorporate these non-idealities into the present framework.

Denote the PHY link capacity of link $l \in \mathcal{A}_t$ over tone n in time slot t by $c_l^{(n,t)}$. The total capacity $c_l$ of link l is simply given by summing the per-tone capacities over all tones and time slots: $c_l = \sum_{n,t} c_l^{(n,t)}$. The per-tone capacity $c_l^{(n,t)}$ is modeled by the Shannon capacity formula for ideal Gaussian signaling given by $$c_l^{(n,t)} \leq \log\left(1 + \frac{G_{ll}^{(n)} P_l^{(n,t)}}{\sum_{\substack{l' \neq l \\ l' \in \mathcal{A}_t}} G_{ll'}^{(n)} P_{l'}^{(n,t)} + 1}\right), \text{ for } \forall l \in \mathcal{A}_t, \forall n, \forall t, \quad (15)$$

where $G_{ll'}^{(n)}$ is the OFDM channel gain from the transmitter of link l' to the receiver of link l over the n-th tone normalized by the noise variance $N_0$. $G_{ll'}^{(n)}$ will be alternatively denoted in the sequel as $G_{O(l),S(l')}^{(n)}$ using the node indices instead of the link indices. $P_l^{(n,t)} \geq 0$ is the transmit power at the transmitter of link l over tone n in time slot t.

The total transmit power at each transmitter is constrained as $$\sum_{\substack{l \in O(k) \\ l \in \mathcal{A}_t}} \sum_n P_l^{(n,t)} \leq NP_{k,\max}, \text{ for } \forall k, \forall n, \forall t, \quad (16)$$

where N is the number of the OFDM tones, $P_{k,max}$ is the maximum average transmit power at node k, averaged over N OFDM tones. Thus the PHY/MAC subproblem without cooperative relaying can be written as (P1) max $\Sigma_{n,t} \Sigma_{l \in \mathcal{A}_t} \lambda_l c_l^{(n,t)}$ subject to (15) (16), $$P_l^{(n,t)} \geq 0, \forall l, n, t. \quad (17)$$

Relaying can aid the transmission of a signal from the source to the destination when the channel between them is weak by providing an alternative path via a relay with a better channel condition. Cooperative relaying differs from conventional relaying in that a set of distributed relay nodes can collaborate to achieve the spatial diversity effect of a multi-antenna array. For example, in the decode-and-forward (DF) cooperative relaying scheme, two or more relays that were able to decode the source data transmit the packet cooperatively to the destination. In the amplify-and-forward (AF) cooperative relaying scheme, the relays simply store the received signal waveform and transmit it simultaneously to the destination. In the setting of multi-hop networks, the cooperation can occur among the nodes along a multi-hop route. Employing various coding and diversity reception strategies, cooperative relaying can have a quite a number of different combinations.

Figure 4:
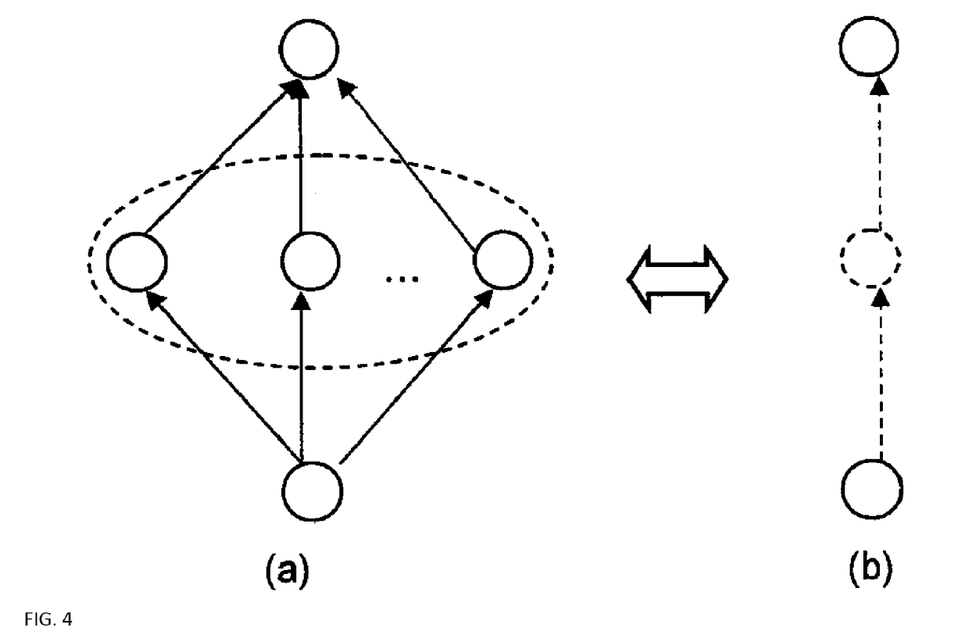
FIG. 4 shows an exemplary cooperative relaying scheme.

To simplify the formulation, only a two-phase DF cooperative relaying scheme depicted in FIG. 4(a) is considered. First, in the broadcast phase, the source node broadcasts the data to be decoded by a cluster of relays. Then, in the cooperation phase, the relays cooperate in transmitting the data to the destination.

To make the cooperative relaying transparent to the higher-layer subproblem, a set of virtual links and nodes are introduced to the original network topology $\mathcal{G}$. Specifically, for each of the cooperating cluster of relays, a virtual node is defined. Then, each cooperative relaying transmission consists of two virtual links: virtual link $l \in \mathcal{E}_b$ that connects the source to a virtual node and virtual link $l' \in \mathcal{E}_c$ that connects the virtual node to the destination (See FIG. 4(b), where the virtual node and links are depicted by the dashed circle and lines). Note that l and l' correspond to the broadcast and the cooperation phases of cooperative relaying, respectively. Then, the higher-layer subproblem can be solved in the exactly same way as for the case without cooperative relaying, over the augmented graph $\mathcal{G}'=(\mathcal{V}, \mathcal{E}')$, where $\mathcal{V}$ represents the set of nodes in the augmented graph, and $\mathcal{E}'=\mathcal{E} \cup \mathcal{E}_b \cup \mathcal{E}_c$ represents the set of links in the augmented graph. Note that the augmented topology can be scheduled using the same "even-odd" framework. To stress the difference of the active link sets for different underlying topologies, the active link sets are denoted as a function of the associated graphs, e.g., $\mathcal{A}_t(\mathcal{G})$. Also, the set of cooperating relays associated with a virtual link $l \in \mathcal{E}_b \cup \mathcal{E}_c$ is denoted by $\mathcal{R}(l)$.

Since the DF relaying is employed, the cooperative relays must all be able to decode the data from the source. Thus, the PHY capacity of a broadcast-phase virtual link $l \in \mathcal{E}_b$ is determined by the minimum of the capacities of the individual links from the source to the relays:

$$c_l^{(n,t)} \leq \min_{k \in \mathcal{R}(l)} c_{l,k}^{(n,t)}, \text{ for } \forall l \in \mathcal{A}_t(\mathcal{G}') \cap \mathcal{E}_b, \forall n, \forall t, \quad (18)$$

where $$c_{l,k}^{(n,t)} \triangleq \log\left(1 + \frac{G_{k,S(l)}^{(n)} P_l^{(n,t)}}{\sum_{\substack{l' \neq l \\ l' \in (\mathcal{E} \cup \mathcal{E}_b) \cap \mathcal{A}_t(\mathcal{G}')}} G_{k,S(l')}^{(n)} P_{l'}^{(n,t)} + \sum_{\substack{l' \neq l \\ l' \in \mathcal{E}_c \cap \mathcal{A}_t(\mathcal{G}')}} \sum_{k' \in \mathcal{R}(l')} G_{k,k'}^{(n)} \hat{P}_{l'}^{(n,t)}(k') + 1}\right). \quad (19)$$

Here, $\hat{P}_l^{(n,t)}(k)$ is the transmit power of the relaying node $k \in \mathcal{R}(l)$ associated with the cooperation-phase virtual link l. In (19), the first term in the denominator of the fraction inside log(·) represents the interference from the other non-cooperative links as well as the interference from the other cooperative links in the broadcast phase, all within the same time slot. Similarly, the second term in the denominator represents the interference coming from the cooperative links in the cooperation phase.

In the cooperation phase, the capacity formula depends on the specific cooperative transmission strategy employed. If the transmit signals can be co-phased at the relays so that the signals add up coherently at the destination, the gain from distributed beamforming can be achieved. Under this scenario, the link capacities of the cooperation-phase virtual links are modeled as $$c_l^{(n,t)} \leq \log\left(1 + \frac{\left(\sum_{k \in \mathcal{R}(l)} \sqrt{G_{Q(l),k}^{(n)} \hat{P}_l^{(n,t)}(k)}\right)^2}{\sum_{\substack{l' \neq l \\ l' \in (\mathcal{E} \cup \mathcal{E}_b) \cap \mathcal{A}_t(\mathcal{G}')}} G_{Q(l),S(l')}^{(n)} P_{l'}^{(n,t)} + \sum_{\substack{l' \neq l \\ l' \in \mathcal{E}_c \cap \mathcal{A}_t(\mathcal{G}')}} \sum_{k' \in \mathcal{R}(l')} G_{Q(l),k'}^{(n)} \hat{P}_{l'}^{(n,t)}(k') + 1}\right), \quad (20)$$

for $\forall l \in \mathcal{A}_t(\mathcal{G}') \cap \mathcal{E}_c, \forall n, \forall t$.

The non-virtual link capacity formulas must also account for the interferences caused by the cooperative transmissions. Thus, in a cooperative relaying-enabled network, (15) should be updated as $$c_l^{(n,t)} \leq \log\left(1 + \frac{G_{ll}^{(n)} P_l^{(n,t)}}{\sum_{\substack{l' \neq l \\ l' \in (\mathcal{E} \cup \mathcal{E}_b) \cap \mathcal{A}_t(\mathcal{G}')}} G_{ll'}^{(n)} P_{l'}^{(n,t)} + \sum_{\substack{l' \neq l \\ l' \in \mathcal{E}_c \cap \mathcal{A}_t(\mathcal{G}')}} \sum_{k' \in \mathcal{R}(l')} G_{Q(l),k'}^{(n)} \hat{P}_{l'}^{(n,t)}(k') + 1}\right), \quad (21)$$

for $\forall l \in \mathcal{A}_t(\mathcal{G}), \forall n, \forall t$.

Also, the power constraints at each node must reflect the cooperative transmissions. This can be modeled by $$\sum_n \left(\sum_{\substack{l \in O(k) \\ l \in (\mathcal{E} \cup \mathcal{E}_b) \cap \mathcal{A}_t(\mathcal{G}')}} P_l^{(n,t)} + \sum_{\substack{l \in \mathcal{E}_c \cap \mathcal{A}_t(\mathcal{G}') \\ k \in \mathcal{R}(l)}} \hat{P}_l^{(n,t)}(k)\right) \leq N P_{k,max}, \quad (22)$$

The PHY subproblem with cooperative relaying transmissions can be written as (P2) max $\sum_{n,t} \sum_{l \in \mathcal{A}_t(\mathcal{G}')} \lambda_l c_l^{(n,t)}$ subject to (18)-(22)

$P_l^{(n,t)} \geq 0, \forall l \in \mathcal{A}_t(\mathcal{G}) \cap (\mathcal{E} \cup \epsilon_b), \forall n, \forall t$ $\hat{P}_l^{(n,t)}(k) \geq 0, \forall l \in \mathcal{A}_t(\mathcal{G}') \cap \epsilon_c, \forall k \in \mathcal{R}_{(l)}, \forall n, \forall t.$ (23)(24)

The PHY/MAC subproblems (P1) and (P2) must be solved for the optimal power profile over the entire OFDMA band for each link and each time slot. As the number of OFDMA tones and links in the network grows large, it becomes essential to seek ways to reduce the computational complexity. First, it can be observed that the problems are actually decoupled in different time slots in our formulation. Therefore, the problems can be solved independently for each time slot t=0 and t=1.

Secondly, it is observed that the total power constraints are the only constraints that couple the problems over different OFDM tones. Therefore, by relaxing the total power constraints by the Lagrange multiplier technique, one can also decouple the problem into N per-tone problems that can be solved independently given the Lagrange multipliers. Then, the computational complexity becomes linear in N, which is a significant reduction especially when N is large. However, the PHY/MAC subproblems (P1) and (P2) are not convex in general due to the non-convexity of the link capacity formulas when interference is present. Therefore, strong duality may not hold and the dual approach may not yield the optimal solution.

Recently, it was discovered that in multicarrier communication systems, the duality gap of the (potentially non-convex) weighted sum capacity maximization problems under a total power constraint approaches zero when the number of the tones N goes to infinity. The intuition is that as N becomes large compared to the number of multipaths in the channel, there are many tones that share similar channel gains with the neighboring tones. These group of tones can approximate the effect of "time-sharing" in the frequency domain to "convexity" the problem. Due to this result, one can still use the dual method to solve the subproblems (P1) and (P2) for complexity reduction, and, in fact, can claim that it actually performs closer to the optimum as N gets large.

It is noteworthy that strong duality holds regardless of the convexity structure of the original problem. Therefore, the problem can incorporate additional non-convex constraints such as finite number of available power and rate levels, or allowing at most one link per tone for pure OFDMA channel allocation.

With the total power constraints (16) relaxed by introducing a set of dual variables $\{\mu_k^{(t)}\}$, the Lagrangian for (P1) can be written as $$\mathcal{L}_{P1}(\{c_l^{(n,t)}\}, \{P_l^{(n,t)}\}, \{\mu_k^{(t)}\}) = \qquad (25)$$

$$\sum_{n,t} \sum_{l \in \mathcal{A}_t} \lambda_l c_l^{(n,t)} - \sum_{t,k} \mu_k^{(t)} \left( \sum_n \sum_{\substack{l \in O(k) \\ l \in \mathcal{A}_t}} P_l^{(n,t)} - NP_{k,max} \right).$$

The dual objective is given by $$g_1(\{\mu_k^{(t)}\}) = \qquad (26)$$

$$\sum_{n,t} \max \left\{ \sum_{l \in \mathcal{A}_t} \lambda_l c_l^{(n,t)} - \sum_k \mu_k^{(t)} \sum_{\substack{l \in O(k) \\ l \in \mathcal{A}_t}} P_l^{(n,t)} \Big|, \right\} + \sum_{t,k} \mu_k^{(t)} NP_{k,max},$$

where it is evident that the problem can be solved for each tone and time slot.

In summary, the decomposed problem for (P1) for tone n and time slot t is given by $$\max \sum_{l \in \mathcal{A}_t} \lambda_l c_l^{(n,t)} - \sum_k \mu_k^{(t)} \sum_{\substack{l \in O(k) \\ l \in \mathcal{A}_t}} P_l^{(n,t)} \text{ subject to (15), (17).} \qquad (27)$$

Similarly, the decomposed problem for (P2) for tone n and time slot t is given by $$\max \sum_{l \in \mathcal{A}_t(\mathcal{G}')} \lambda_l c_l^{(n,t)} - \qquad (28)$$

$$\sum_k \mu_k^{(t)} \left( \sum_{\substack{l \in O(k) \\ l \in (\mathcal{E} \cup \mathcal{E}_b) \cap \mathcal{A}_t(\mathcal{G}')}} P_l^{(n,t)} + \sum_{\substack{l \in \mathcal{E}_c \cap \mathcal{A}_t(\mathcal{G}') \\ k \in \mathcal{R}_{(l)}}} \hat{P}_l^{(n,t)}(k) \right)$$

Subject to (18)-(21) and (23)-(24)

Although a hierarchical decomposition approach of first decomposing the problem (1) into two subproblems in different layers and then further decomposing the PHY/MAC subproblems (P1) and (P2) into the per-tone problems, this is merely for convenience of exposition. In actual implementation of the optimization algorithm, the decomposition can be done without such a hierarchy so that all the subproblems can be solved in parallel and the dual prices $\lambda$ and $\mu$ can be updated simultaneously for faster convergence.

Next, the solution methods for the per-tone PHY/MAC subproblems will be addressed including various practical issues in implementing the optimization algorithms. Also, closed-form solutions for the per-tone problems are obtained in some special cases.

The optimal primal variables can be recovered in principle by maximizing the Lagrangian given the dual prices, i.e., by solving the associated subproblems. However, this must be done with care since there can be multiple maximizers of the Lagrangian, and some of them might not be feasible solutions to the original problem.

This is manifested in our problem setup most clearly in solving the PHY/MAC subproblems for those links whose transmitters do not meet the power constraints with equality. Note that in multi-hop networks, bottleneck links often appear (usually near the gateway) because all the network traffic is eventually siphoned off at the gateway. Due to the bottleneck effect, the remaining parts of the network often have unused resources. For those nodes k whose power constraints are slack in time slot t, the optimal dual price $\lambda_k^{(t)*}$ must be zero from the complementary slackness condition. Then, it can be verified that the optimal dual prices $\lambda_l^*$ for $l \in \mathcal{O}(k) \cap \mathcal{A}_{t_t}$ could also be zero. For example, if a link l∈$\mathcal{O}(k) \cap \mathcal{A}_{t_l}$ does not interfere with any other link in the time slot, $\lambda_l$ must be zero. When this is the case, the optimal primal solution cannot be recovered from the optimal dual prices.

To prevent this, a small term $-\epsilon\Sigma_{l,n,t}P_l^{(n,t)}$ is added to the objective of (P1), where $\epsilon > 0$ is a small constant. Similarly, $-\epsilon\Sigma_{l\in\mathcal{E}_\cup}\mathcal{E}_{b,n,t}P_l^{(n,t)} - \epsilon\Sigma_{l\in\mathcal{E}_c,n,t}\Sigma_{k\in\mathcal{R}_{(l)}}\hat{P}_l^{(n,t)}(k)$ is added to the objective of (P2). Then, the per-tone problems that are solved for (P1) and (P2) are given by replacing $\mu_k^{(t)}$ with $(\mu_k^{(t)} + \mathcal{E})$ in (27) and (28), respectively. This replacement has the following interpretation: whenever the nodes have slack power constraints and the corresponding dual prices become very small, the optimization is automatically switched to the total transmit power minimization for the slack nodes.

The per-tone problem (27) was considered in numerous references albeit the context may be different. A number of different numerical techniques to solve it were proposed in the literature. In, a discretized exhaustive search was used, which has a merit in that a solution quite close to the global optimum can be obtained if the discretization is fine enough. However, the complexity is exponential in the number of the links in the network, which makes it feasible only for a very small network. A coordinate descent search was used in to reduce the complexity. The search converges to a local optimum. A game theoretic approach was considered, where each player (link) maximizes a payoff function that approximates her interference contribution to the other players to the first order. The game can be shown to converge to a local optimum of the original problem. When the SINRs in the capacity formulas are much larger than 0 dB, e.g., by a large processing gain in the spread-spectrum systems, a high SINR approximation can be employed to transform the original problem into a geometric program (GP), which in turn can be transformed to a convex optimization problem. In the mid- or low SINR regime, iterative procedures were developed that solve a series of convex optimization problems. The algorithms can also be shown to converge to a local optimum of the original problem.

Although these techniques provide quite efficient means to find a local optimum of the per-tone subproblems, they often caused a glitch in the overall dual method in our numerical experiments. For example, when the dual update was done by the ellipsoid method, the optimization algorithm often converged to an infeasible solution even with a sufficiently large N. In fact, only the discretized exhaustive search yielded satisfactory solutions for all the test problems that we experimented. Obviously, this is caused by non-idealities of our problem formulation, which assumed a zero duality gap for the PHY/MAC subproblems.

The convergence behavior of the dual method for a non-convex NUM problem was studied in. An important theorem proved in the work states that if the primal optimal variables $x^*(\lambda)$ recovered by optimizing the Lagrangian $\mathcal{L}(x,\lambda)$ is continuous with respect to $\lambda$ at the optimal dual price $\lambda=\lambda^*$, then strong duality holds and the dual method converges to the global optimum.

Based on this result, an intuitive explanation as to why the algorithms that yield a local optimum of the per-tone problem often cause a non-zero duality gap is as follows. In order for the recovered primal optimal variables $\{P_l^{(n,t)*}\}$ to be (almost) continuous with respect to the dual prices $\{\mu_k^{(t)}\}$, a small change in the values of $\{\mu_k^{(t)}\}$ should not cause a large portion of the N per-tone problems to switch to a different local optimum abruptly. However, if all the per-tone problems are exploring only the vicinity of a single starting point, the chances of such cases will be high.

In order to avoid the exponential complexity of the discretized exhaustive search yet still to obtain a feasible solution, a couple of heuristic remedies are adopted. First, by noting that the set of highly interfering links will not be active at the same time at the optimal solution, the link activation sets $\mathcal{A}_{t_l}$ are partitioned into a small number of subsets with at most several links in each subset, and each of these subsets are considered separately. For example, the links that share the same transmitters or receivers will most likely not share the same OFDM tone due to excessive interference. The per-tone problems can be solved for each of these subsets and the one with the largest optimum value is selected. Then, a simple gradient projection method can be used with multiple random starting points. The gradient projection method still yields a local optimum, but due to the multiple starting points, the per-tone problem solver can examine more diversified search space. In our numerical results, even with a small number of starting points (say, $N_S=5$), the dual method yielded feasible solutions.

In the case of using cooperative relaying, the gradient search method cannot be applied to solve (28) directly. The reason is that since the capacity formula (18) for the broadcast-phase operation involves a minimum of functions, it is not differentiable. A straightforward way to solve a non-differentiable optimization problem is to use the subgradient method. However, the subgradient method is usually quite slow.

In this work, a smooth approximation of the minimum can approximate $$\min_{k \in \mathcal{R}_{(l)}} c_{l,k}^{(n,t)}(P) \quad (29)$$

by $$-\frac{1}{d}\log\left\{\sum_{k \in \mathcal{R}_{(l)}} w_k e^{-dc_{l,k}^{(n,t)}(P)}\right\}, \quad (30)$$

where P is the vector of the relevant optimization variables representing the transmit power, d is a positive constant and $\{w_k\}$ satisfy $\Sigma_{k\in R(l)}w_k=1$ and $w_k \geq 0$. The approximation can be made increasingly accurate by updating the parameter d and the weights $\{w_k\}$ according to the expressions $$d(m'+1) = \beta d(m') \quad (31)$$

$$w_k(m'+1) = \frac{w_k(m')e^{-d(m')c_{l,k}^{(n,t)}(P^*(m'))}}{\sum_{k' \in \mathcal{R}_{(l)}} w_{k'}(m')e^{-d(m')c_{l,k'}^{(n,t)}(P^*(m'))}}, \quad (32)$$

where $\beta > 1$ is a constant, m' is the iteration count, and P*(m') is the optimal power vector obtained from solving the m'-th approximate problem. Thus, to solve the per-tone problem (28), a series of approximated problems are solved until convergence.

Next, solutions for pure OFDMA are discussed. When no spatial reuse of the OFDM tones is allowed, i.e., when pure OFDMA is enforced, closed-form solutions can be obtained for the per-tone problems. Since only one link can be activated on a particular tone in a particular time slot, essentially the problem is to find the link for each tone and time slot that maximizes the objective of the per-tone problems.

If a non-virtual link l∈ $\mathcal{A}_{t_t}$ is activated on tone n in time slot t, the optimal power can be readily obtained from the KKT conditions, and are given by $$P_\ell^{(n,t)*} = \left[ \frac{\lambda_\ell}{\mu_{S(\ell)}^{(t)} + \varepsilon} - \frac{1}{G_{\ell\ell}^{(n)}} \right]^+. \quad (33)$$

When a cooperative relaying link is activated, the optimal power allocation is determined in a simple closed form provided that the number of relays is two (|$\mathcal{R}(l)$|=2). If a broadcast-phase virtual link l∈ $\mathcal{E}_b$ is activated on tone n in time slot t, the optimal transmit power is calculated to be $$P_\ell^{(n,t)*} = \left[ \frac{\lambda_\ell}{\mu_{S(\ell)}^{(t)} + \varepsilon} - \frac{1}{G_{k^*,S(\ell)}^{(n)}} \right]^+, \quad (34)$$

where k* is the node associated with the minimum capacity link, i.e., $$k^* = \arg \min_{k \in \mathcal{R}(\ell)} c_{\ell,k}^{(n,t)}. \quad (35)$$

For a cooperation-phase virtual link l∈E_c, the optimal powers at the two cooperating relays $k_i \in R(l)$, i=1, 2 are given by $$\hat{P}_\ell^{(n,t)*}(k_i) = \frac{1}{\eta_i^2} \left[ \frac{\lambda_\ell \eta_i}{\mu_{k_i}^{(t)} + \varepsilon} - \frac{1}{G_{Q(\ell),k_i}^{(n)}} \right]^+, \quad (36)$$

where $$\eta_i = 1 + \frac{\mu_{k_i}^{(t)} + \varepsilon}{\mu_{k_{3-i}}^{(t)} + \varepsilon} \cdot \frac{G_{Q(\ell),k_{3-i}}^{(n)}}{G_{Q(\ell),k_i}^{(n)}}. \quad (37)$$

Then, the index of the link $l^* \in \mathcal{A}_{t_t}(\mathcal{G})$ that is chosen to be activated is the maximizer of the objective:

$$l^* = \arg\max_\ell \Big\{ \lambda_\ell \log(1 + G_{\ell\ell}^{(n)} P_\ell^{(n,t)*}) - \mu_{S(\ell)}^{(t)} P_\ell^{(n,t)*} \big|_{\ell \in \mathcal{A}_t(\mathcal{G})}, \quad (38)$$

$$\lambda_\ell \log(1 + G_{k^*,S(\ell)}^{(n)} P_\ell^{(n,t)*}) - \mu_{S(\ell)}^{(t)} P_\ell^{(n,t)*} \big|_{\ell \in \mathcal{A}_t(\mathcal{G}') \cap \mathcal{E}_b},$$

$$\lambda_\ell \log\left(1 + \left( \sum_{k \in \mathcal{R}(\ell)} \sqrt{G_{Q(\ell),k}^{(n)} \hat{P}_\ell^{(n,t)*}(k)} \right)^2 \right) -$$

$$\sum_{k \in \mathcal{R}(\ell)} \mu_k^{(t)} \hat{P}_\ell^{(n,t)*}(k) \big|_{\ell \in \mathcal{A}_t(\mathcal{G}') \cap \mathcal{E}_c} \Big\}.$$

The optimal resource allocation problem for OFDMA wireless multi-hop networks was studied by modeling the cross-layer interaction of routing, MAC and physical layer. In addition to the complexity of the multi-layer optimization, the OFDMA air interface incurs significant challenge to the problem due to the large number of subchannels to which the resources must be optimally distributed. Moreover, when mutual interference between the links is modeled for maximal spatial reuse of the spectral resources, the problem becomes non-convex and is difficult to solve. The dual decomposition technique decouples the problem into different layers and OFDM tones without losing optimality when the number of the tones is large. The resulting subproblems can be separately solved under the coordination of the dual prices that link the subproblems, which reduces the computational complexity significantly. By exploiting the flexibility of this framework, the cooperative relaying technique improves the balanced end-to-end throughput of the network. Under the practical half-duplex constraints of the radios, the cooperative relaying identifies a unique avenue to alleviate the bottleneck phenomenon that typically manifests itself in multi-hop networks. That is, the cooperative relaying can exploit the unused resources in the non-bottleneck links to aid the links that are in bottleneck condition, which gives a net increase in the overall throughput.

What is claimed is:

1. A method to allocate one or more resources in a multi-hop network, comprising:
   a. solving one or more higher-layer sub-problems;
   b. solving one or more physical layer and media access control (PHY/MAC) layer sub-problems per tone per time slot with one of cooperative relaying of radio signals; or spatial reusing of radio spectrum; and no cooperative relaying of radio signals and no spatial reusing of the radio spectrum;
   c. updating prices; and
   d. allocating radio resources based on the PHY/MAC layer sub-problems;

$$P_\ell^{(n,t)*} = \left[ \frac{\lambda_\ell}{\mu_{S(\ell)}^{(t)} + \delta} - \frac{1}{G_{\ell\ell}^{(n)}} \right]^+ \text{ including solving}$$

$$l^* = \arg\max_\ell \{ \lambda_\ell \log(1 + G_{\ell\ell}^{(n)} P_\ell^{(n,t)*}) - \mu_{S(\ell)}^{(t)} P_\ell^{(n,t)*} \big|_{\ell \in A_t(G)} \}.$$

2. The method of claim 1, comprising solving one or more physical layer and media access control (PHY/MAC) layer sub-problems per tone per time slot with cooperative relaying of radio signals and no spatial reusing of radio spectrum.

3. The method of claim 2, comprising:

$$P_\ell^{(n,t)*} = \left[ \frac{\lambda_\ell}{\mu_{S(\ell)}^{(t)} + \delta} - \frac{1}{G_{k^*,S(\ell)}^{(n)}} \right]^+ \hat{P}_\ell^{(n,t)*}(k_i) = \frac{1}{\eta_i^2} \left[ \frac{\lambda_\ell \eta_i}{\mu_{k_i}^{(t)} + \delta} - \frac{1}{G_{Q(\ell),k_i}^{(n)}} \right]^+$$

$$l^* = \arg\max_\ell \Big\{ \lambda_\ell \log(1 + G_{\ell\ell}^{(n)} P_\ell^{(n,t)*}) - \mu_{S(\ell)}^{(t)} P_\ell^{(n,t)*} \big|_{\ell \in A_t(G')},$$

$$\lambda_\ell \log(1 + G_{k^*,S(\ell)}^{(n)} P_\ell^{(n,t)*}) - \mu_{S(\ell)}^{(t)} P_\ell^{(n,t)*} \big|_{\ell \in A_t(G') \cap \varepsilon_b},$$

$$\lambda_\ell \log\left(1 + \left( \sum_{k \in R(\ell)} \sqrt{G_{Q(\ell),k}^{(n)} \hat{P}_\ell^{(n,t)*}(k)} \right)^2 \right) - \sum_{k \in R(\ell)} \mu_k^{(t)} \hat{P}_\ell^{(n,t)*}(k) \big|_{\ell \in A_t(G') \cap \varepsilon_c} \Big\}.$$

4. The method of claim 1, comprising solving one or more physical layer and media access control (PHY/MAC) layer sub-problems per tone per time slot with no cooperative relaying of radio signals but with spatial reusing of radio spectrum.

5. The method of claim 4, comprising solving $$\max \sum_{\ell \in A_t} \lambda_\ell c_\ell^{(n,t)} - \sum_k (\mu_\ell^{(t)} + \delta) \sum_{\substack{\ell \in O(k) \\ \ell \in A_t}} P_\ell^{(n,t)}$$

$$\text{subject to } P_\ell^{(n,t)} \geq 0, \; c_\ell^{(n,t)} \leq \log\left(1 + \frac{G_{\ell\ell}^{(n)} P_\ell^{(n,t)}}{\sum_{\substack{\ell' \neq \ell \\ \ell' \in A_t}} G_{\ell\ell'}^{(n)} P_{\ell'}^{(n,t)} + 1}\right)$$

numerically with multiple initial points.

6. The method of claim 1, comprising solving one or more physical layer and media access control (PHY/MAC) layer sub-problems per tone per time slot with cooperative relaying of radio signals and spatial reusing of radio spectrum.

7. The method of claim 6, comprising solving $$\max \sum_{\ell \in A_t(G')} \lambda_\ell c_\ell^{(n,t)} -$$

$$\sum_k (\mu_\ell^{(t)} + \delta)\left(\sum_{\substack{\ell \in O(k) \\ \ell \in (\varepsilon \cup \varepsilon_b) \cap A_t(G')}} P_\ell^{(n,t)} + \sum_{\substack{\ell \in \varepsilon_c \cap A_t(G') \\ k \in R(\ell)}} \hat{P}_\ell^{(n,t)}(k)\right) \text{s.t.}$$

$$c_\ell^{(n,t)} \leq \min_{k \in R(\ell)} c_{\ell,k}^{(n,t)}, \; \forall \ell \in A_t(G') \cap \varepsilon_b,$$

$$c_{\ell,k}^{(n,t)} \triangleq \log\left(1 + \frac{G_{k,S(\ell)}^{(n)} P_\ell^{(n,t)}}{\sum_{\substack{\ell' \neq \ell \\ \ell' \in (\varepsilon \cup \varepsilon_b) \cap A_t(G')}} G_{k,S(\ell')}^{(n)} P_{\ell'}^{(n,t)} + \sum_{\substack{\ell' \neq \ell \\ \ell' \in \varepsilon_c \cap A_t(G')}} \sum_{k' \in R(\ell')} G_{k,k'}^{(n)} \hat{P}_{\ell'}^{(n,t)}(k') + 1}\right)$$

$$c_\ell^{(n,t)} \leq \log\left(1 + \frac{\left(\sum_{k \in R(\ell)} \sqrt{G_{Q(\ell),k}^{(n)} \hat{P}_\ell^{(n,t)}(k)}\right)^2}{\sum_{\substack{\ell' \neq \ell \\ \ell' \in (\varepsilon \cup \varepsilon_b) \cap A_t(G')}} G_{Q(\ell),S(\ell')}^{(n)} P_{\ell'}^{(n,t)} + \sum_{\substack{\ell' \neq \ell \\ \ell' \in \varepsilon_c \cap A_t(G')}} \sum_{k' \in R(\ell')} G_{Q(\ell),k'}^{(n)} \hat{P}_{\ell'}^{(n,t)}(k') + 1}\right),$$

$$\forall \ell \in A_t(G') \cap \varepsilon_c$$

$$c_\ell^{(n,t)} \leq \log\left(1 + \frac{G_{\ell\ell}^{(n)} P_\ell^{(n,t)}}{\sum_{\substack{\ell' \neq \ell \\ \ell' \in (\varepsilon \cup \varepsilon_b) \cap A_t(G')}} G_{\ell\ell'}^{(n)} P_{\ell'}^{(n,t)} + \sum_{\substack{\ell' \neq \ell \\ \ell' \in \varepsilon_c \cap A_t(G')}} \sum_{k' \in R(\ell')} G_{Q(\ell),k'}^{(n)} \hat{P}_{\ell'}^{(n,t)}(k') + 1}\right), \; \forall \ell \in A_t(G')$$

numerically with multiple initial points.

8. The method of claim 7, comprising solving an approximate problem given by $$\max \sum_{\ell \in A_t(G')} \lambda_\ell c_\ell^{(n,t)} -$$

$$\sum_k (\mu_\ell^{(t)} + \delta)\left(\sum_{\substack{\ell \in O(k) \\ \ell \in (\varepsilon \cup \varepsilon_b) \cap A_t(G')}} P_\ell^{(n,t)} + \sum_{\substack{\ell \in \varepsilon_c \cap A_t(G') \\ k \in R(\ell)}} \hat{P}_\ell^{(n,t)}(k)\right) \text{s.t.}$$

$$c_\ell^{(n,t)} \leq -\frac{1}{d}\log\left(\sum_{k \in R(\ell)} w_k e^{-d c_{\ell,k}^{(n,t)}(P)}\right), \; \forall \ell \in A_t(G') \cap \varepsilon_b,$$

$$c_{\ell,k}^{(n,t)} \triangleq \log\left(1 + \frac{G_{k,S(\ell)}^{(n)} P_\ell^{(n,t)}}{\sum_{\substack{\ell' \neq \ell \\ \ell' \in (\varepsilon \cup \varepsilon_b) \cap A_t(G')}} G_{k,S(\ell')}^{(n)} P_{\ell'}^{(n,t)} + \sum_{\substack{\ell' \neq \ell \\ \ell' \in \varepsilon_c \cap A_t(G')}} \sum_{k' \in R(\ell')} G_{k,k'}^{(n)} \hat{P}_{\ell'}^{(n,t)}(k') + 1}\right)$$

$$c_\ell^{(n,t)} \leq \log\left(1 + \frac{\left(\sum_{k \in R(\ell)} \sqrt{G_{Q(\ell),k}^{(n)} \hat{P}_\ell^{(n,t)}(k)}\right)^2}{\sum_{\substack{\ell' \neq \ell \\ \ell' \in (\varepsilon \cup \varepsilon_b) \cap A_t(G')}} G_{Q(\ell),S(\ell')}^{(n)} P_{\ell'}^{(n,t)} + \sum_{\substack{\ell' \neq \ell \\ \ell' \in \varepsilon_c \cap A_t(G')}} \sum_{k' \in R(\ell')} G_{Q(\ell),k'}^{(n)} \hat{P}_{\ell'}^{(n,t)}(k') + 1}\right),$$

$$\forall \ell \in A_t(G') \cap \varepsilon_c$$

$$c_\ell^{(n,t)} \leq \log\left(1 + \frac{G_{\ell\ell}^{(n)} P_\ell^{(n,t)}}{\sum_{\substack{\ell' \neq \ell \\ \ell' \in (\varepsilon \cup \varepsilon_b) \cap A_t(G')}} G_{\ell\ell'}^{(n)} P_{\ell'}^{(n,t)} + \sum_{\substack{\ell' \neq \ell \\ \ell' \in \varepsilon_c \cap A_t(G')}} \sum_{k' \in R(\ell')} G_{Q(\ell),k'}^{(n)} \hat{P}_{\ell'}^{(n,t)}(k') + 1}\right), \; \forall \ell \in A_t(G').$$

9. The method of claim 1, comprising repeating (a)-(c) until convergence.

10. The method of claim 1, wherein the solving the higher-layer sub-problem comprises solving:

$$\max s_{min} - \lambda^T x$$

subject to $s_{min} \leq s$ $Ax = s$ $x \succeq 0$.

11. A system to allocate one or more resources in a multi-hop network, comprising:
  one or more base stations; and
  a radio resource controller coupled to the one or more base stations, the radio resource controller including computer readable code to:
  solve one or more higher-layer sub-problems;
  solve one or more physical layer and media access control (PHY/MAC) layer sub-problems per tone per time slot with one of: cooperative relaying of radio signals; or spatial reusing of radio spectrum; and no cooperative relaying of radio signals and no spatial reusing of the radio spectrum;
  update prices; and
  allocate radio resources based on the PHY/MAC layer sub-problems;

$$P_l^{(n,t)*} = \left[\frac{\lambda_l}{\mu_{S(l)}^{(t)} + \eth} - \frac{1}{G_{ll}^{(n)}}\right]^+$$

including solving $$l^* = \arg\max_l \{\lambda_l \log(1 + G_{ll}^{(n)} P_l^{(n,t)*}) - \mu_{S(l)}^{(t)} P_l^{(n,t)*} |_{l \in A_t(G)}\}.$$

12. The system of claim 11, comprising code to solve one or more physical layer and media access control (PHY/MAC) layer sub-problems per tone per time slot with no cooperative relaying of radio signals and no spatial reusing of the radio spectrum.

13. The system of claim 11, comprising code to solve one or more physical layer and media access control (PHY/MAC) layer sub-problems per tone per time slot with cooperative relaying of radio signals and no spatial reusing of radio spectrum.

14. The system of claim 11, comprising code to solve one or more physical layer and media access control (PHY/MAC) layer sub-problems per tone per time slot with no cooperative relaying of radio signals but with spatial reusing of radio spectrum.

15. The system of claim 11, comprising code to solve one or more physical layer and media access control (PHY/MAC) layer sub-problems per tone per time slot with cooperative relaying of radio signals and spatial reusing of radio spectrum.

16. A method to allocate one or more resources in a multi-hop network, comprising:
 a. solving one or more higher-layer sub-problem(s);
 b. solving one or more physical layer and media access control (PHY/MAC) layer sub-problems per tone per time slot with one of cooperative relaying of radio signals; spatial reusing of radio spectrum; and no cooperative relaying of radio signals but with spatial reusing of the radio spectrum;
 c. updating prices; and
 d. allocating radio resources based on the PHY/MAC layer sub-problems;

$$\max \sum_{l \in A_t} \lambda_l c_l^{(n,t)} - \sum_k (\mu_l^{(t)} + \eth) \sum_{\substack{l \in O(k) \\ l \in A_t}} P_l^{(n,t)}$$

subject to $P_l^{(n,t)} \geq 0$, $c_l^{(n,t)} \leq \log\left(1 + \dfrac{G_{ll}^{(n)} P_l^{(n,t)}}{\sum_{\substack{l' \neq l \\ l' \in A_t}} G_{ll'}^{(n)} P_{l'}^{(n,t)} + 1}\right)$.

* * * * *